United States Patent

[11] 3,609,550

[72] Inventor Edward Guyer
Los Angeles, Calif.

[21] Appl. No. 833,886
[22] Filed June 6, 1969
[45] Patented Sept. 28, 1971
[73] Assignee TRW Inc.
Redondo Beach, Calif.
Continuation of application Ser. No. 568,209, July 27, 1966, now abandoned.

[54] DEMODULATOR FOR TRANSMITTED PHASE MODULATED TERNARY INFORMATION
4 Claims, 3 Drawing Figs.

[52] U.S. Cl. .......... 325/30, 178/67, 178/88, 325/320, 329/124
[51] Int. Cl. .......... H04l 27/14
[50] Field of Search .......... 325/30, 320; 178/66, 67, 68, 88; 329/122, 124, 126

[56] References Cited

UNITED STATES PATENTS

| | | | |
|---|---|---|---|
| 3,114,109 | 12/1963 | Melas | 328/63 |
| 3,242,262 | 3/1966 | Melas | 178/66 |
| 3,242,431 | 3/1966 | Crafts | 325/320 |
| 3,348,149 | 10/1967 | Crafts | 325/30 |
| 3,371,279 | 2/1968 | Lender | 325/320 |
| 3,376,511 | 4/1968 | Brothman | 325/320 |

*Primary Examiner*—Robert L. Griffin
*Assistant Examiner*—Kenneth W. Weinstein
*Attorneys*—Daniel T. Anderson, Alfons Valukonis and Frank E. Wattles

ABSTRACT: In a communication system which has apparatus for transmitting phase shift ternary information wherein each of the items of ternary information is transmitted by introducing through quadriphase modulation discreet phase shifts in a carrier signal there is provided a demodulator for demodulating the phase shift information. The demodulator provides for first deriving first and second reference signals wherein the first reference signal has a predetermined phase delay with respect to the carrier signal, and the second reference signal has another predetermined phase delay with respect to the first reference signal. Also provided for is the comparing of the carrier signal and the reference signals to provide a pair of output signals containing the phase shift ternary information. The pair of output signals is then converted to provide the ternary information.

Figure 1A:
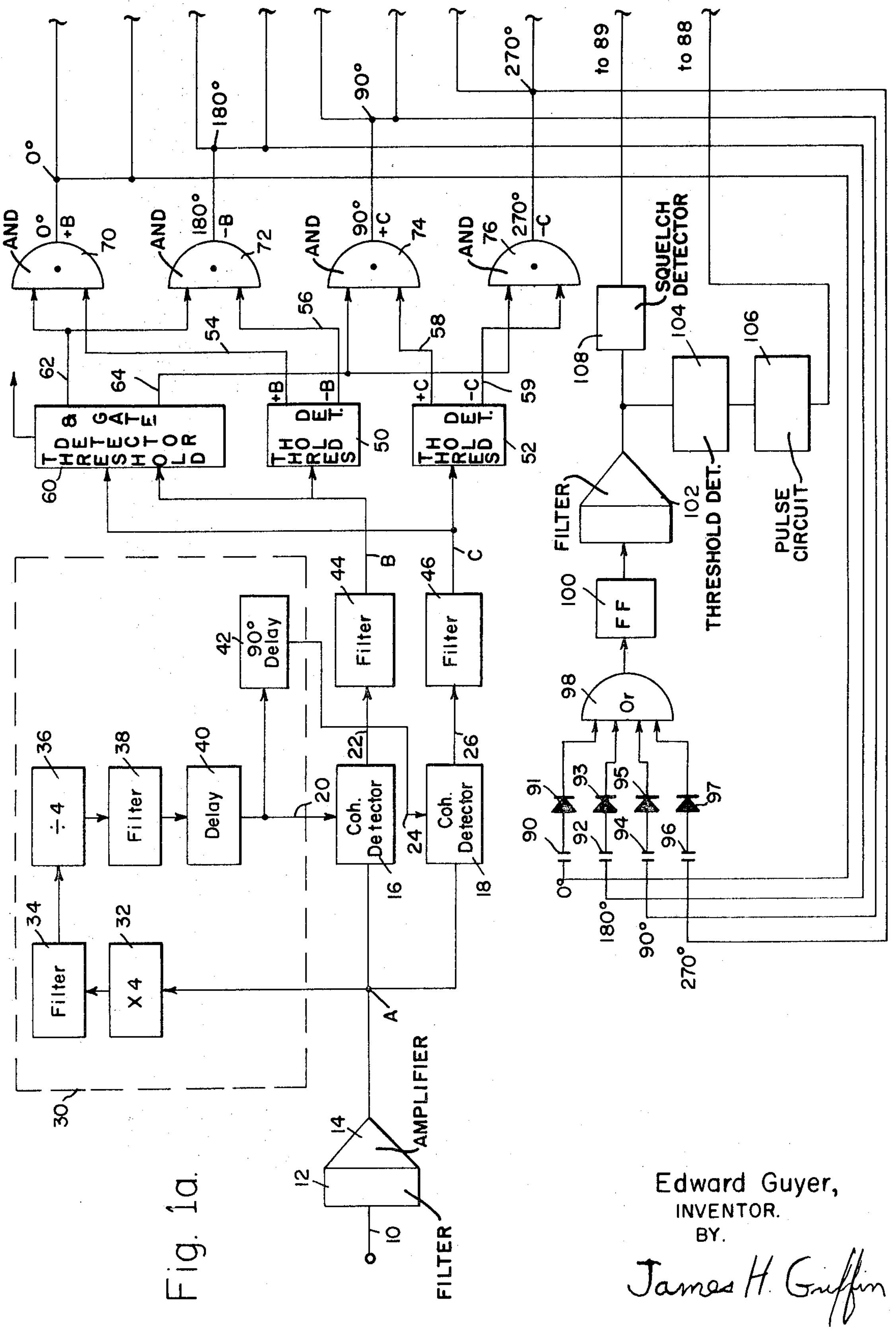

This invention relates to a communication system wherein ternary information transmission is effected by phase modulating the carrier or subcarrier signals, and more particularly relates to a demodulator for the phase modulated ternary information.

Edward Guyer,
INVENTOR.
BY.
James H. Griffin
ATTORNEY.

DEMODULATOR FOR TRANSMITTED PHASE MODULATED TERNARY INFORMATION

This case is a continuation of application Ser. No. 568,209 filed July 27, 1966, now abandoned.

Data encoding and transmission is a field where constant refinement and optimization has been necessary in order to speed up transmission, conserve power in transmission, and fit increasing amounts of information into a given amount of signal. Along with the above considerations, a continuing problem in data transmission is that of the presence of error defects creeping into the signals transmitted, so that the interpretation of the signals by the receiver thereof varies from what was intended. For radio transmission of information, other important advantages of an information encoding system include bandwidth economy, which is to say—a need for a more narrow frequency band to perform transmission than other competing encoding systems—and improved circuitry. Circuitry for most communication systems is improved whenever it is made more simple, inexpensive, and lower in power requirements. At the present time such improvement is most easily accomplished by maximizing the use of microelectronic circuits in a transmission and demodulation system; and the use of microelectronics is, of course, enhanced by performance of digital rather than analog operations. Especially in situations where information is being transmitted between ground stations and spacecraft or aircraft, reliable circuitry and extreme economy of weight and power consumption are of the greatest importance to the success and performance longevity of the entire spacecraft or aircraft system.

Accordingly, the invention provides a concept of data transmission according to which information encoded using a given number N of distinct indices is transmitted by phase-modulating a carrier of subcarrier signal through N+1 discreet phase states. Every new item of information can then be transmitted by shifting the carrier phase by a certain unique amount. To illustrate, a binary information code has two discreet indices, "1" and "0". According to the instant invention, therefore, discreet phase shifts of carrier signal would be used; preferably 120° and 240°. "1" would then be transmitted as a 120° phase shift; while "0" would then be transmitted as a 240° phase shift. With ternary information, where items or indices of "S", "0", and "1", must be transmitted N+1=3+1=4; so that quadriphase modulation would be used, with "S" represented as a 90° phase shift, "0" as a 180° phase shift, and "1" as a 270° phase shift.

From the above binary and ternary examples of the application of the principles of this invention, it can be seen that whenever a data transmission system uses at least one more modulation phase mode than it has information code indices, each distinct code index can be assigned a phase shift other than 0° or 360°. For example, in the transmission of binary coding, only 120° and 240° phase shift are used, leaving 0° phase shift and 360° phase shift out altogether. Likewise, with ternary information, only 90°, 180°, and 270°, are used. The result of this principle is that whenever any bit of information is modulated, some readily identifiable phase shift will occur.

It waS stated above that the transmission of synchronization signals and the detection of error in signals transmitted were two very important requirements of any communications system. In many military and spacecraft applications, it is important to achieve system "lock-on" as quickly as possible, so that the receiving station will be able to decode signals received with a minimum of delay after the beginning of reception. The information transmission system of this invention has an inherent synchronization property, because every new item of information can occur only when a phase shift occurs and, conversely, phase shift will not occur unless a new item of information is being transmitted.

In similar manner the adverse effects of error in the system are held to the absolute minimum. In any data transmission system, the occurrence of an error involves at least the loss of one item of information. This cannot be avoided. On the other hand, in many systems the reliance of subsequent items upon the data that came before causes one error, such as a dropout, to make unintelligible all the transmission signals which follow for a certain period of time. As an example, in any method of storing or communicating information where an item information is indicated by a transition from one state to another state, the loss of one or more such transitions may well introduce an ambiguity into the meaning of all the transitions which follow. With the communication system of the present invention, however, every new phase shift representing a certain item of information relates only to the phase of the carrier, which may of course be a subcarrier, as it occurred before the phase shift was introduced. For similar reasons, initial lock-on is very quick. If a delay line is used to store the prior phase information, lock-on can be immediate; but such a delay line would be noisy and very bulky. The preferred expedient disclosed in detail below is a phase-locked loop, which cannot achieve lock-on until phase lock has been established. A phase-locked loop has advantages that far outweigh this slight lock-on delay; e.g. low noise and the fact that it stores digitally, so that small, reliable microelectronic circuits can be used in its implementation.

From the above discussion the principle of the instant invention might well be recast into its most succinct form by the concept that each bit of information to be transmitted is modulated by introducing a discernable phase shift or other change in the carrier or subcarrier. The result of this principle is that minimal synchronization error on lock-on problems can occur, because each phase-shift-modulated bit refers only to the phase of the carrier signal as it existed before the phase shift was imposed.

Figures 1B, 2:
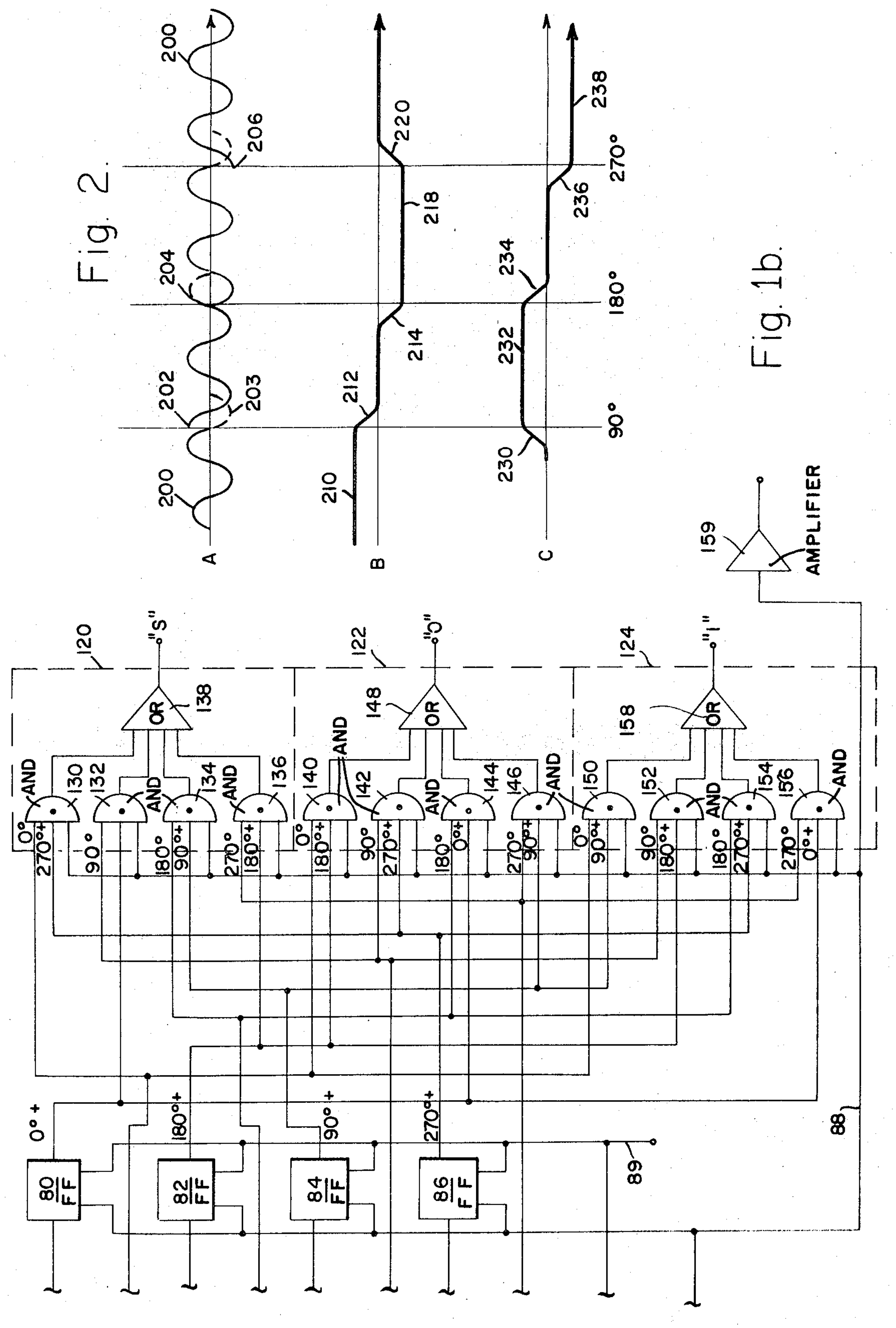

Other objects and features of the instant invention and a better understanding thereof may be had by referring to the following description and claims taken in conjunction with the accompanying drawings in which:

FIGS. 1*a* and 1*b*, which together comprise FIG. 1, are a block diagram of a demodulator for signals transmitted according to the principles of the instant invention; and, FIG. 2 is a graph of waveforms at various significant points in the block diagram of FIG. 1.

Referring to FIG. 1, the preferred practice of the above-discussed principles involves the quadriphase modulation of ternary information. As stated in the example above, ternary information is encoded using three different states: "S", "0", and "1".

In modulating a carrier or subcarrier for the transmission of this ternary information according to the principles of this invention, a discreet phase shift is introduced into the carrier to represent each item of information "S", "0", or "1". In order to distinguish between the three ternary indices, a different phase shift is assigned to each. In the preferred practice of the invention, "S" has a phase shift of 90°, "0" has a phase shift of 180°, and "1" has a phase shift of 270°. The electronic circuitry for imposing such phase shift modulation upon a carrier frequency is well known in the prior art and thus is not described in detail herein.

FIG. 1, shows in block form the electronic system for demodulating signals transmitted according to the communication concepts of the invention. The demodulation system has an input terminal 10 to which the signals to be demodulated are applied. A filter 12 and an amplifier 14 are used to remove noise and unwanted frequencies. The amplifier 14 should be tuned to the input carrier frequency and should have a pass band wide enough to pass the input carrier frequency and sidebands to be handled by the demodulation system. The output of the filter-amplifier 12–14 is represented by the waveform A in FIG. 2. The output waveform A is applied to two synchronous detectors 16 and 18. These two synchronous detection circuits may be identical to one another and of any of a number of designs will known in the communications art. The function of the synchronous detectors 16 and 18 is to compare the input signal at A with a reference signal and to indicate that the input signal at A and the reference signal are in phase by producing a DC component in their output signals. A reference signal is applied to the synchronous detector 16 at the terminal 20 thereon and the output signal form the synchronous detector 16 appears at 22. Similarly, a reference signal is applied to the synchronous detector 18 at 24, and the output signal therefrom appears at 26.

The reference signals to be applied at 20 and 24 are derived from the signal at A and do not require the transmission of synchronization information along with the signals arriving from 10. The derivation of reference signals is accomplished by a network 30 which very narrowly filters the signal at A to leave only the carrier without modulating frequencies superimposed thereon, and also introduces a delay in the waveform A. The preferred implementation of the functions of the network 30 involves quadrupling the frequency of the waveform A at 32. Thereafter, at 34, the quadrupled waveform A is subjected to very narrow band-pass filtering. Any group delay introduced by the narrow band-pass filter 34 may be corrected by a suitable phase shift. Passive filtering may be simplified by heterodyning the input signals before they are applied at 10.

Following filtering at 34 the multiplied waveform A is then divided at 36 in order to return it to its former frequency. Following division at 36 the waveform A is filtered at 38 to eliminate all unwanted frequencies. This carrier frequency is subjected to a phase delay at 40; the phase delay at 40 ensures that when the waveform A in compared at 16 and at 18 with the reference signals 20 and 24, the comparison will always be with the desired reference phase, regardless of how much modulated phase shift may appear on the waveform A with each new item of ternary information.

Inasmuch as the synchronous detectors 16 and 18 must demodulate quadriphase-modulated signals, the reference phase at synchronous detector 18 must be 90° out of phase with the synchronous detector 16. For this purpose, the waveforms coming out of the delay portion 40 of the network 30 has a 90° phase shift introduced into it at 42 before it is applied to the reference input terminal 24 of the synchronous detector 18. The reference signal for the input terminal 20 of the synchronous detector 16 is taken directly from the delay line 40.

The output signal produced by the synchronous detector 16 and appearing on the output terminal 22 thereof is filtered at 44 to remove unwanted AC components. When there is phase coherence between the waveform A and the reference signal applied at 20, the synchronous detector 16 will have a DC component in its output signal that will be passed by the low-pass filter 44. Correspondence between this DC component and the various possible phases of the waveform A is illustrated by the waveforms B of FIG. 2. In like manner, the output of the synchronous detector 18 is filtered at 46; and if the waveform A in in phase with the 90° shifted reference signal 24, a DC component C will appear in the output signal of the synchronous detector 18, as represented at FIG. 2.

In effect, the presence of a DC signal at the point B in FIG. 1 indicates that the input waveform A is either 0°, or 180° in phase relative to the reference signal at 20. On the other hand, the presence of a DC signal at the point C in FIG. 1 indicates that the input waveform A has a phase relationship with the reference signal at 20 of either 90° or 270°. In the case of the synchronous detector 16, the 180° phase shift is distinguishable from 0° or 360° phase shift because the DC signal at B will be negative for 180° but positive for 0° or 360°; and in like manner, the 90° phase shift DC signal from the synchronous detector 18 is positive, while the 270° DC is negative. Thus, the DC signals at B and C, taken together, contain all the ternary information that was originally quadriphase-modulated, transmitted, received, and applied to the input terminal 10. The circuitry to which the waveforms A, B and C are applied, therefore, has the function of converting the information contained in the DC signals B and C back into its original ternary form.

The first step in this conversion is the application of the DC signals B and C to two respective threshold detectors 50 and 52. The threshold detector 50 has two outputs 54 and 56; the output line 54 is energized when the DC signal B is positive, while the output line 56 is energized when the DC signal B is negative. The threshold detector 52 also has two output lines 58 and 59. The output line 58 is positive when the DC signal C is positive, and the output line 59 is positive when the DC signal C is negative. Both the signals B and C are also applied as inputs to a combination threshold detector and gating circuit numbered 60. The circuit 60 has two outputs, 62 and 64. The output line 62 will be energized whenever the absolute value of the DC signal B is greater than the absolute value of the DC signal C. The output line 64 will be energized whenever the absolute value of the DC signal C is greater than the absolute value of the DC signal B. The function of the circuit 60, therefore, is to determine the relative magnitudes of the signals B and C to produce an output indicative of which phase jump, to the nearest 90°, has most recently been imposed upon the waveform A.

The output signals from the circuits 50, 52, and 60 are applied as inputs to four AND gates 70, 72, 74, and 76. In particular, the plus B line 54 is applied to and AND gate 70, while the minus B line is applied to the AND gate 72, the plus C line 58 is applied to the AND gate 74, and the minus C line 59 is applied to the AND gate 76. The other input to each AND gate is derived from the gating circuit 60. The "B predominant" line 62 serves to enable the AND gates 70 and 72, while the "C predominant" line 64 enables the AND gates 74 and 76. The result of this arrangement is that only the AND gates 70 and 72 will be enabled when the absolute value of the output of the synchronous detector 16 is greater than the absolute value of the output of the synchronous detector 18. The DC signal C will be unable to pass through either the AND gate 74 of the AND gate 76. On the other hand, when the DC signal C is predominant, the AND gates 70 and 72 will not be enabled , but the AND gates 74 and 76 will be enabled by the electrical signal on the "C predominant" line 64.

Based on the above arrangement of the threshold detectors 50 and 52, the gating circuit 60 , and the AND gates 70–76, it can be seen that only one of the AND gates will be producing an output signal at any given moment in time. If the AND gate 70 is showing an output signal, that is an indication that the DC signal B is larger than the DC signal C and that the DC signal B is positive. As discussed above, this is a condition corresponding to 0° or 360° phase relationship between the waveform A and the reference signal 20 derived therefrom. Similarly, it can be seen that if the AND gate 72 is producing an output signal, the input signal A is shifted 180°, and if the AND gate 74 is producing a signal, the input signal A is shifted 90°, and if the AND gate 76 is producing a signal, the input A is shifted 270° from the reference phase.

Because the ternary information quadriphase-modulated onto the input signals arriving at 10 is embodied in phase shift or phase delay, rather than in absolute phase, relationship, it is necessary to compare the phase relationships represented by the output signals of the AND gates 70–76 with the phase relationship of the next preceding bit of information. To accomplish this task the demodulator of FIG. 1 has four bistable multivibrators of "flip-flops" numbered 80, 82, 84, and 86. The flip-flop 80 has for one input the output of the AND gate 70, and the flip-flops 82, 84, and 86 have similar relationships to their respective AND gates 72, 74, and 76. Each flip-flop is also connected to a synchronization signal line 88 and a squelch signal line 89. The output lines of each flip-flop 80–86 will be activated only if the AND gate associated with that flip-flop was producing a signal the last time that a synchronization signal appeared on the sync line 88. The presence of a signal on the output line of the flip-flop 80 would indicate that the AND gate 70 had produced the last signal, which is to say, that the phase relationship of the input signal A had last been 0° or 360°. This last preceding phase relationship has been indicated by placing a "plus" sign after the phase reading, so that the output line of flip-flop 80 is marked $0^{\circ+}$. Upon the same principle, the output line of the flip-flop 82 is associated with 180°+, the output line of the flip-flop 84 is associated with 90°+, and the output line of the flip-flop 86 is associated with 270°+.

As was stated above, it is a feature of this invention that no separate synchronization information need be transmitted with the phase-modulated signal. Accordingly, the synchronization signals appearing on the line 88 are derived from information inherent in the waveform A. More particularly, the signals on the line 88 are derived from the phase shift information appearing as the output of the AND gate 70–76. These outputs are applied to respective capacitors 90, 92, 94, 96. The capacitors 90–96 differentiate the signals applied to them, and have their outputs applied through diodes 91–97, respectively, to an OR gate 98. The effect of this arrangement is that whenever one of the AND gates 70–76 commences producing a signal at its output terminal, one of the capacitors 90–96 produces a positive-going differential spike which is passed through one of the capacitors 91–97 and through the OR gate 98. Since the differentials of all the output signals coming from the AND gate 70–76 are in effect manifolded at the OR gate 98, it can be seen that the output of the OR gate 98 will be differential spikes appearing at the information rate of the demodulation system.

Thus, the items of information appearing in the input applied to the demodulator of FIG. 1 produce their own sync pulses. Not only does this feature of the invention eliminate the need for transmitting synchronization information but also it permits the demodulator of FIG. 1 to operate over a range of information rates with little or no change in component values. In fact, if the digital circuitry appearing beyond the points B and C of FIG. 1 is designed to operate at the highest possible information rate, the main element in deterioration of performance will be loss of power efficiency as the information rate declines. Moreover, if microcircuitry is used to any degree, even this power loss is of very little consequence.

The preferred method of deriving synchronization signals from the differential spikes appearing at the output of the OR gate 98 is to apply this output to a flip-flop 100 which switches at a rate determined by the differential spikes. The output of the flip-flop 100 may then be filtered at 102 by a filter having its band pass centered at the expected information frequency. The AC signal produced by the filter 102 may then be applied to a threshold detector 104 which switches a pulsing circuit 106 to produce the sync signals appearing on the line 88.

In a demodulator circuit of the sort shown in FIG. 1, it is highly desirable to have "squelch" capability, which is to say—to be able to prevent information output when some characteristic of the input signal indicates that the data arriving is defective and meaningless. Accordingly, there may be coupled to the sync derivation circuit a squelch detector 108 which in effect imposes a disabling signal on the squelch line 89 whenever the detected information rate energy falls below some critical level which indicates that signal dropout, interruption of transmission, or some other contingency has occurred such that the information contained in the output of the AND gates 70–76 is no longer reliably meaningful. The squelch signals on the line 89 are connected to the flip-flops 80–86 in such manner as to cause them to reset, so that no "-prior-phase" information appears on their output terminals, 0°+, 180°+, 90°+, and 270°+.

The signal outputs of the AND gate 70–76, the flip-flops 80–86, and the synchronization signal extraction circuitry just described are gated to recast the information contained therein into ternary form by three baud gate networks 120, 122, and 124, corresponding to "S", "0", and "1", respectively. At the input to each gate 120, 122, or 124, is a bank of four AND gates. In the "S" gate 120 the AND gates are numbered 130, 132, 134, and 136. In the "o" gate 122 the AND gates are numbered 140, 142, 144, and 146. In the "1" gate 124 the AND gates are numbered 150, 152, 154, and 156. In each gate 120–124 an output signal "S", "o", or "1", is produced by combining the outputs of the AND gates in that particular gate in an OR gate, numbered 138 for the gate 120, 148 for the gate 122 and 158 for the gate 124.

Since one input to every one of the AND gates 130–156 is the signal from the synchronization signal line 88, the output of the demodulator of FIG. 1 is in digital form. The synchronization signal from the line 88 is also driven through an amplifier 159 into the circuitry wherein the ternary information at the output of the OR gates 138, 148, and 158 is to be used, with the result that the relative-time synchronization pulses derived from the input signals to the demodulator are carried through to circuitry beyond the demodulator, along with the information to which they relate.

As stated above, for purposes of illustration herein the ternary information to be transmitted by the data system of the instant invention has been quadriphase-modulated according to the following formula: "S"=90° phase shift, "0"=180° shift, and "1"=270° phase shift. Related to the outputs of the AND gates 70–76 and of the flip-flops 80–86, the above quadriphase-modulation formulas would read as follows:

$$S=0^\circ\cdot 270^{\circ+}+90^\circ\cdot 0^{\circ+}+180^\circ\cdot 90^{\circ+}+270^\circ\, 180^{\circ+}$$

$$0=270^\circ\cdot 90^{\circ+}+0^\circ\cdot 180^{\circ+}+90^\circ\cdot 270^{\circ+}+180^\circ\cdot 0^{\circ+}$$

$$1=0^\circ\cdot 90^{\circ+}+90^\circ\cdot 180^{\circ+}+180^\circ\cdot 270^{\circ+}+270^\circ\cdot 0^{\circ+}$$

In particular, the gate 120 should signify the ternary digit "S" at the output of its OR gate 138 whenever the waveform A has shifted 90° from its previous phase. Such a phase shift could be in the form of a shift from 270° absolute phase to o° absolute phase, or from 0° to 90°, or from 90° to 180°, or from 180° to 270°. These four different forms of phase shift may be detected by AND gating an appropriate prior-phase reading from one of the flip-flops 80–86 and a phase reading from the AND gate 70–76. More particularly, the AND gate 130 may have as inputs the output of the flip-flop 86 and the output of the AND gate 70. Thus, when a 270°+reading and a 0° reading occur simultaneously, upon the arrival of the next sync signal from the line 88 the AND gate 130 will produce an output signal which will pass through the OR gate 138 to indicate the ternary integer "S."

In similar fashion, the AND gate 132 produces an output upon the simultaneous occurrence of 0°+ and 90°, and the AND gate 134 produces an output signal upon the simultaneous occurrence of 90°+ and 180°, and the AND gate 136 produces an output signal upon the simultaneous occurrence of 180°+ and 270°. Thus, the four contingencies reflected in the "S" logic equation given above are sensed by the AND gates 130–136 and summed by the OR gate 138 to produce an "S" indication whenever one of the four contingencies occurs. Since the four contingencies of the "S" equation are the only four ways in which a 90° phase shift could appear in the input waveform A, any such phase shift will result in the production of a "S" indication at the output of the modulator of FIG. 1.

Just as the gate 120 implements the "S" logic equation given above, so the gates 122 and 124 implement the logic equations for "0" and "1." The gate 122 has inputs to its four AND gates 140–146 representing the four different ways that a 180° phase shift could be indicated by the outputs of the AND gates 70–76 and the flip-flops 80–86. If a 180° shift is indicated in any one of these four ways, the appropriate AND gate 140–146 will have an output signal which will cause the OR gate 148 to produce a "0" indication. Similarly, the AND gates 150–156 of the gate 124 have inputs representing the four possible ways that a 270° phase shift could appear in the outputs of the AND gates 70–76 and the flip-flops 80–86. Whenever such a 270° phase shift has occurred in the input waveform A, one of the AND gates 150–156, will produce an output signal which will cause the OR gate 158 to indicate "1."

Referring to FIG. 2, the performance of the circuit of FIG. 1 may best be explained by examining in detail the input waveform A and the DC signals B and C which emerge from the synchronous detectors 16 and 17. It can be seen that the waveform A is a sinusoid 200 of a certain unchanged frequency, which ordinarily will be in the megacycle range but could be as low as the audio range if it were desired to use the communication concepts of the instant invention for transmitting information over telephone lines. The amplitude of the sinusoid 200 FIG. is not varied for the purpose of modulating information onto the sinusoid. Rather, the sinusoid has information modulated onto it by the introduction of phase shift. This may easily be accomplished, as is well known in the prior art, by passing the sinusoid through a number of phase shifting circuits, each adapted to shift the phase by a different amount, and then switching between phase shifting circuits as new phase shifts to be modulated onto the carrier 200. In particular, for the quadri-phase modulation of the carrier 200, four-way switching could be required: one channel for 0° phase shift, one channel to shift the phase 90°, one channel to shift the phase 180°, and one channel to shift the phase 270°. The ternary signals to be modulated onto the carrier 200 would have the effect of switching the carrier by 90°, 180°, or 270°. The effect upon the waveform A of the introduction of the 90° phase shift is shown at 202. While the sinusoid 200 would ordinarily continue on as shown by the dotted lines 203, the 90° phase shift introduction causes it in effect to jump forward one quarter of a wavelength and continue on from that point in mirror image to the unshifted sinusoid that had gone before.

In similar manner, the introduction of a 180° phase shift as shown at 204 causes a sinusoid 200 to jump forward a half a wavelength and then continue on in the same form as it had been before. Likewise, the introduction of 270° phase shift as shown at 206 causes the waveform A to jump forward three quarters of a wavelength and then continue on.

The effect of the phase-modulated waveform at A upon the synchronous detector 16 when compared with the reference signal derived at 30 is shown by the waveform B. As shown at 210, the 0° phase shift in the waveform A will result in a positive DC signal being produced at 22 by the coherent detector 16. As 90° phase shift appears in the waveform A, the DC signal B declines as shown at 212 to 0 level as long as the 90° phase orientation persists. Upon the arrival of 180° phase phase shift in the waveform A, the DC signal B declines as shown at 214 to a negative DC level 218 indicative of 180° phase orientation. This negative DC level continues as long as the waveform A is oriented by 180° and then rises again as shown at 220 to 0 throughout the 270° phase orientation of the waveform A.

As stated above, the synchronous detector 18 compares the waveform A with the same reference signal developed at 30 as is used by the synchronous detector 16, but this reference signal has a 90° phase shift introduced to it at 42 and is in quadrature. The DC signals of the waveform C are identical to those of the waveform B, but shifted 90°. More particularly, the output of the synchronous detector 18 when comparing the waveform A with the reference signal appearing at 24 is 0 during the unmodulated or 0° phase orientation of the waveform A, then rises at 230 to a positive DC level 232 throughout the 90° phase orientation portion of the waveform A. As 180° phase orientation is introduced the waveform C declines at 234 to 0 again where it remains until it declines further at 236 to a negative DC level 238 indicative of 270° phase orientation. Thus, the various phase orientations 90°, 180°, and 270° , of the input waveform A are decoded by the synchronous detectors 16 and 18 to produce DC signals

I claim: AT B or C, which DC signals the digital portion of the demodulator of FIG. 1 can utilize through various switching stages to produce the ternary information quadri-phase modulated onto the waveform A.

From the above detailed description, it can be seen that there is provided an improved data transmission system in which both modulation and demodulation may be performed by simple and largely integrated-circuit networks. Another accomplishment of the invention is avoiding the necessity of tying the data transmitted to a separate synchronization signal; this is accomplished by using a combination of data encoding and carrier modulation whereby every item of data requires a nonzero phase shift, so that each item can also be relied upon as its own time-base or sync reference. The invention provides for more efficient transmission of data (in terms of bandwidth used) and for simpler and more reliable circuitry than in the prior art, where analog methods where used.

As far as signal dropout or other error is concerned, an examination of the effect of the waveform A upon the demodulator of FIG. 1 will show that an erroneous or omitted phase shift in the waveform 2 A will produce error only in the item of information which is directly related to that omitted phase shift and in the item of information next following that phase shift. Thereafter, the demodulator will detect phase shifts with equal facility regardless of what misleading changes in the waveform A have gone before.

Although the invention has been described in its preferred form with a certain degree of particularity it should be understood that the present disclosure of the preferred form has been made only by way of example and that numerous changes in the details of the carrier modulation referred to and of the demodulator of FIG. 1 and in the combination and arrangement of logic blocks and the like may be resorted to without departing from the spirit and the scope of the invention as hereinafter claimed. Applicant wishes to emphasize especially that the inventive principles are not limited to sinusoidal carriers, but could apply equally well to square wave sawtooth, and other waveshapes, regular or irregular.

I claim:

1. In a communication system having means for transmitting phase shift ternary information wherein each of the items of ternary information is transmitted by introducing through quadri-phase modulation discreet phase shifts in a carrier signal, and demodulator means for demodulating the phase shift information, said demodulator means comprising:

means responsive to said carrier signal for deriving first and second reference signals, said first reference signal having a predetermined phase delay with respect to the carrier signal, and said second reference signal having another predetermined phase delay with respect to said first reference signal;

means for comparing said carrier signal and said reference signals to provide a pair of output signals containing said phase shift ternary information; and means for converting said pair of output signals to provide said ternary information comprising:

threshold detector means responsive to said pair of output signals for providing polarity signals indicative of the electrical polarities of said pair of output signals;

threshold detector and gating circuit means responsive to said pair of output signals for providing absolute value signals indicative of either of said pair of output signals having a greater absolute electrical value than the other;

AND gate means responsive to said polarity and absolute value signals for providing phase shift signals indicative of the phase difference between said carrier and reference signals;

means responsive to said phase shift signals for generating synchronization signals indicative of the rate of received phase shift information, and squelch signals indicative of the unreliability of said phase shift signals;

multivibrator means connected to said AND gate means, and responsive to said phase shift, synchronization, and squelch signals for providing signals only during simultaneous occurrence of said synchronization and phase shift signals, and during the absence of said squelch signals; and gate network means connected to said multivibrator means and responsive to said synchronization signals for providing signals indicative of said ternary information.

2. In the communications system of claim 1 wherein said means for deriving said first and second reference signals comprises:

multiplier means for multiplying the frequency of said carrier signal;

filter means for selecting said multiplied carrier signal;

divider means for dividing said selected multiplied carrier signal;

filter means for selecting said divider carrier signal;

phase delay means for delaying said divided carrier signal to provide said first reference signal; and phase delay means for delaying said first reference signal to provide said second reference signal.

3. In the communications system of claim 1 wherein said first reference signal phase delay means comprises:

90° phase delay means.

4. In the communications system of claim 1 wherein said comparing means comprises:

synchronous detector means.